(12) United States Patent
Weber

(10) Patent No.: US 8,238,552 B2
(45) Date of Patent: Aug. 7, 2012

(54) PASSWORD KEY DERIVATION SYSTEM AND METHOD

(75) Inventor: Dominik Weber, El Sereno, CA (US)

(73) Assignee: Guidance Software, Inc., Pasadena, CA (US)

( * ) Notice: Subject to any disclaimer, the term of this patent is extended or adjusted under 35 U.S.C. 154(b) by 847 days.

(21) Appl. No.: 12/371,370

(22) Filed: Feb. 13, 2009

(65) Prior Publication Data

US 2010/0208888 A1     Aug. 19, 2010

(51) Int. Cl.
*H04L 9/00* (2006.01)

(52) U.S. Cl. .............................. 380/44; 713/183; 726/22

(58) Field of Classification Search .................... 380/44; 713/183–185; 726/22
See application file for complete search history.

(56) References Cited

U.S. PATENT DOCUMENTS

| | | | |
|---|---|---|---|
| 6,985,583 B1 | 1/2006 | Brainard et al. | |
| 7,171,679 B2 * | 1/2007 | Best et al. | 726/4 |
| 7,363,494 B2 | 4/2008 | Brainard et al. | |
| 7,367,053 B2 * | 4/2008 | Sanai et al. | 726/6 |
| 7,502,467 B2 * | 3/2009 | Brainard et al. | 380/44 |
| 7,502,933 B2 * | 3/2009 | Jakobsson et al. | 713/172 |
| 7,685,431 B1 * | 3/2010 | Mullany | 713/184 |
| 7,698,555 B2 * | 4/2010 | Jiang et al. | 713/168 |
| 7,734,045 B2 * | 6/2010 | Sandhu et al. | 380/44 |
| 7,886,345 B2 * | 2/2011 | Kaliski et al. | 726/6 |
| 8,108,683 B2 * | 1/2012 | Canetti et al. | 713/182 |
| 8,108,932 B2 * | 1/2012 | Himberger et al. | 726/25 |
| 2006/0256961 A1 | 11/2006 | Brainard et al. | |
| 2007/0067625 A1 | 3/2007 | Jiang et al. | |
| 2007/0271398 A1 | 11/2007 | Manchester et al. | |
| 2008/0005562 A1 | 1/2008 | Sather et al. | |
| 2008/0072320 A1 | 3/2008 | Hurley | |
| 2008/0216170 A1 | 9/2008 | Sanai et al. | |
| 2008/0222002 A1 | 9/2008 | Hu et al. | |
| 2008/0235772 A1 * | 9/2008 | Janzen | 726/5 |
| 2009/0158406 A1 * | 6/2009 | Jancula et al. | 726/5 |
| 2011/0055585 A1 * | 3/2011 | Lee | 713/183 |

FOREIGN PATENT DOCUMENTS

| | | |
|---|---|---|
| EP | 1 050 789 A2 | 11/2000 |
| WO | WO 2006/014358 A1 | 2/2006 |
| WO | WO 2006/089101 A2 | 8/2006 |
| WO | WO 2008/065351 A1 | 6/2008 |

OTHER PUBLICATIONS

B. Kaliski, PKCS #5: Password-Based Cryptography Specification Version 2.0, Network Working Group, RSA Laboratories, Sep. 2000.

* cited by examiner

*Primary Examiner* — Kambiz Zand
*Assistant Examiner* — Amare F Tabor
(74) *Attorney, Agent, or Firm* — Christie, Parker & Hale, LLP

(57) ABSTRACT

A password-based key derivation function includes a sub-function that gets executed multiple times based on an iteration count. A key derivation module computes the iteration count dynamically with each entered password. The iteration count is computed as a function of the password strength. Specifically, the weaker the password, the higher the iteration count; but the stronger the password, the smaller the interaction count. This helps strengthen weaker passwords without penalizing stronger passwords.

22 Claims, 3 Drawing Sheets

PASSWORD KEY DERIVATION SYSTEM AND METHOD

BACKGROUND OF THE INVENTION

A key derivation function is a function that derives one or more secret keys from a secret value and/or other know information. Password-based key derivation functions derive the secret keys from secret passwords or passphrases, which typically do not have the desired properties to be used directly as cryptographic keys.

Key derivation functions often have a sub-function (e.g. a hash function or block encryption/decryption) that gets executed many times. This makes the key derivation function deliberately slower so as to impede dictionary and brute-force attacks. The number of times that the sub-function gets executed is based on an iteration count (I) which is usually fixed or part of transmitted and/or stored operating parameters. The higher the iteration count (I), the higher the computational work on an attacker who attempts to crack the password by trying different guesses of the password. However, a large iteration count (I) also increases the cost of the key derivation process for an authorized user of the system.

An example of a modern password-based key derivation function is PBKDF2 (specified in RFC 2898. PBKDF2 recommends a minimum of 1000 iterations. However, it may not always be necessary to do so many iterations if the password chosen is one that is deemed to be strong, because brute-force attacks are less effective for strong passwords. Strong passwords are generally more difficult to crack.

Accordingly, what is desired is a more efficient and flexible password-based key derivation function which does not compromise its key strengthening objectives.

SUMMARY OF THE INVENTION

According to one embodiment, the present invention is directed to a system and method for generating and utilizing cryptographic keys. A key generating system is equipped with a processor and a memory that stores program instructions that allows the generating and utilizing of the cryptographic keys. In this regard, the key generating system receives a password and measures the strength of the received password. A strength metric is output in response to this measurement. The key generating system dynamically computes an iteration count I as a function of the output strength metric. The cryptographic function is repeated according to the computed I number of times, and a cryptographic key is derived based on the repeated cryptographic function and the received password. The generated cryptographic key is then transmitted to a key utilizing system for use therewith.

According to one embodiment of the invention, the password is a secret code associated with a user of the key generating system, and may contain alphanumeric characters and/or numeric values.

The strength of the received password may be measured according to many ways. For example, a length of the password may be measured and used as the password strength. According to this example, the iteration count decreases as the length of the password increases.

According to one embodiment of the invention, the measuring of the strength of the received password includes determining whether the password is a word contained in a dictionary. According to this embodiment, the iteration count for a particular password contained in the dictionary is higher than the iteration count for another password not contained in the dictionary.

According to one embodiment of the invention, the measuring of the strength of the received password includes compressing the password by the key generating system, and measuring efficacy of the compression. If a first password compresses better than a second password based on, for example, the number of bits that result from the compression, the iteration count for the first password is set higher than the iteration count for the second password. Thus, according to this embodiment, the iteration count increases as the compression efficacy increases; and conversely, the iteration count decreases as the compression efficacy decreases.

According to one embodiment of the invention, the measuring of the strength of the received password includes determining by the key generating system the strength of each character in the received password. The key generating system aggregates the strength of each character, and generates the strength metric based on the aggregate strength.

According to one embodiment of the invention, if the strength metric is outside a pre-determined strength boundary, a pre-defined iteration count is selected as the iteration count I. In this manner, the dynamically computed iteration count is constrained to minimum and maximum values.

According to one embodiment of the invention, the cryptographic function is a sub-function of a key derivation function that generates the cryptographic key.

According to one embodiment of the invention, a secure communication is established between the key generating system and the key utilizing system based on the generated cryptographic key.

A person of skill in the art should recognize that one of the advantages of having a dynamically computed interaction count is that it allows weak passwords to have higher iteration counts and be slower to compute than stronger passwords. Thus, unlike the prior art where the iteration count is fixed, the dynamic nature of the interaction count according to embodiments of the present invention allows the iteration count to the customized based on password strength. This allows a more efficient use of computer resources for generating cryptographic keys, and also improves strength for weak passwords while not penalizing strong ones.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

Figure 1:
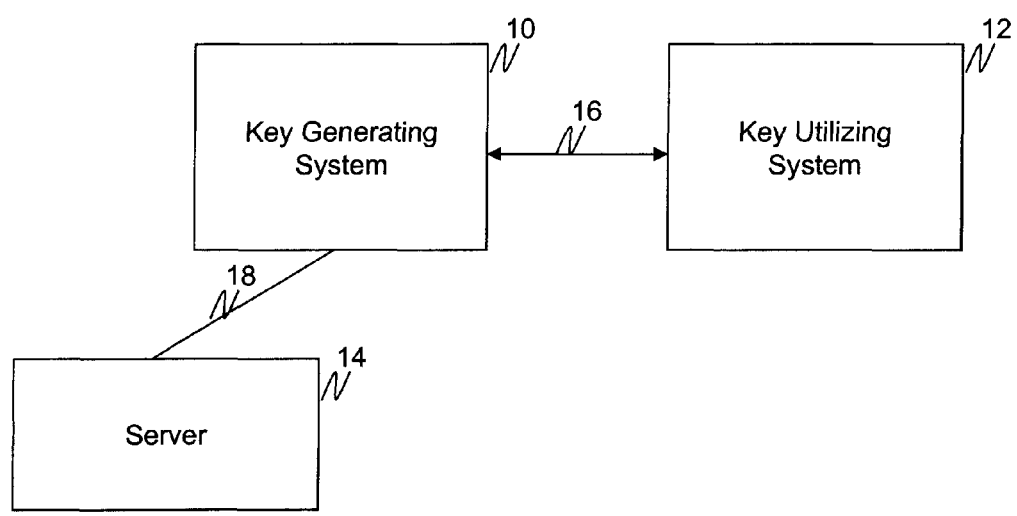
FIG. 1 is a schematic block diagram of a computer system generating and utilizing cryptographic keys according to one embodiment of the invention.

FIG. 1 is a schematic block diagram of a computer system generating and utilizing cryptographic keys according to one embodiment of the invention. Once generated, such cryptographic keys may be used for message encryption, identity authentication, digital signature generation, and/or other cryptographic activities. In the illustrated embodiment, the system includes a key generating system 10 coupled to a key utilizing system 12 over a data communications link 16.

According to one embodiment of the invention, the key generating system 10 includes one or more computers, smart devices, interface devices, and/or the like, for generating and communicating a cryptographic key. The smart device may be, for example, a smart card, personal digital assistant (PDA), cellular phone, or the like.

The one or more computers and/or smart devices included in the key generating system 10 are equipped with a microprocessor, memory, and user interface for receiving a password, passcode, PIN, or other alphanumeric character or numeric value associated with a user, and for generating a cryptographic key based on the received password. The key utilizing system 12 also includes a computer and/or other smart device that receives and utilizes the generated cryptographic key for authenticating a user of the key generating system 10, providing access to stored data, engaging in secure (encrypted) communication with the key generating system 10, performing other cryptographic functions, and the like. For example, the cryptographic key may be a decryption key that protects sensitive data such as, for example, password and hard drive image files. Although the key generating system 10 is depicted in FIG. 1 as being separate from the key utilizing system 12, a person of skill in the art should recognize that in other embodiments, the key generating and utilizing systems may be combined into a single system.

The key generating system 10 may be coupled to a server 14 over a data communications link 18. According to one embodiment of the invention, the server 14 may be configured to transmit to the key generating system 10, one or more input parameters of a function invoked by the key generating system in generating a cryptographic key. The data communications link 16, 18 may be a direct wire, an infrared data port, a wireless communications link, global communications link such as the Internet, or any other communications medium known in the art.

According to one embodiment of the invention, the key generating system 10 includes a key derivation module which is invoked for generating a cryptographic key based on a received password. The key derivation module may be implemented as software which resides in a memory coupled to a processor included in the computer or other smart device forming part of the key generating system 10. Although the key derivation module may be implemented as software, a person of skill in the art should recognize that the module may also be implemented via hardware, firmware (e.g. ASIC), or a combination of hardware, firmware, and/or software.

Figure 2:
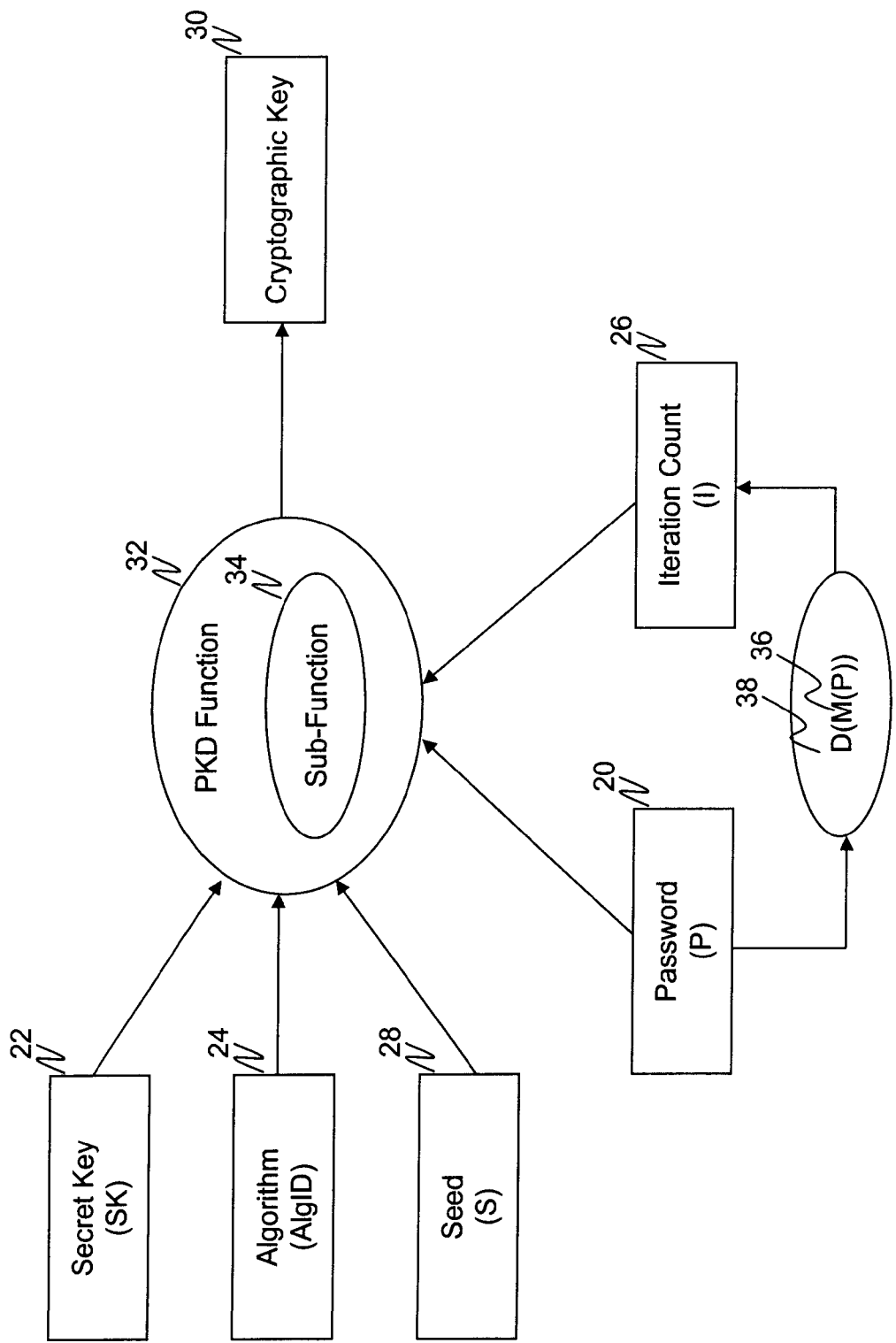
FIG. 2 is a functional block diagram of a key derivation module according to one embodiment of the invention.

FIG. 2 is a functional block diagram of the key derivation module according to one embodiment of the invention. The module invokes a password-based key derivation function 32 in order to derive a cryptographic key 30. The function receives as input at least a password (P) 20 and an iteration count (I) 26. Other inputs to the function are optional, and may include a secret key (SK) 22 and other operating parameters such as, for example, an algorithm ID (AlgID) 24, seed 28, and the like. According to one embodiment, the password (P) 20 is a secret code known to a user of the key generating system 10 for uniquely identifying the user. The secret key (SK) 22 is a secret value that may be generated by the key generating system 10 or provided to the key generating system by the server 14. The iteration count (I) is an integer value greater or equal to 0, and indicates the number of times a cryptographic sub-function 34 is to be executed to derive the cryptographic key. The sub-function 34 may be a hash function, a block encryption/decryption function, or any other pseudorandom function conventional in the art. The seed 28 may be a random value generated by the key generating system 10 or provided to the key generating system by the server 14. The seed acts as a cryptographic salt and helps frustrate dictionary attacks. The algorithm ID 24 identifies the specific PKD function 32 and sub-function 34 to be used to derive the cryptographic key 30. According to one embodiment of the invention, the repeating of the sub-function 34 to derive the cryptographic key 30 helps impede brute-force attacks.

The various inputs to the password-based key derivation (PKD) function 32 are used to turn the password 20 into the cryptographic key 30. The PKD function 32 may thus be described as a function that maps a password to a key, and may be expressed as follows:

$K = PKD(P, I, SK, S, \text{etc.})$

According to one embodiment of the invention, the key derivation module computes the iteration count (I) 26 dynamically for each entered password (P). That is, the iteration count (I) is not a static number that is pre-stored, or predefined and transmitted to the key derivation module from an outside source. This is different from the prior art where the operating parameters including the iteration count (I) are stored, transmitted with the data to be decrypted, or fixed or hard-coded by convention or standard as part of the operating parameters.

In dynamically computing the iteration count (I), the key derivation module makes an association between the iteration count (I) and the strength of the input password 20. Specifically, the weaker the password, the higher the computed iteration count; but the stronger the password, the smaller the computed interaction count. The prior art does not make this association between iteration counts and password strengths. Because the iteration count scales with the password strength, one benefit of the key derivation method according to embodiments of the present invention is that it becomes easier to prevent attacks that attempt to crack the password by repeated password guesses because such guessing is generally more costly in terms of computer resources than in systems where the iteration count is fixed. Thus, the strength of weak passwords may be increased while not penalizing strong passwords.

According to one embodiment of the invention, the key derivation module includes a metric function M( ) 36 that computes the strength of the password (P) and outputs a strength metric based on the computation. The strength metric is fed to a dynamic iteration count function D( ) 38 which calculates a suitable iteration count (I) as a function of the strength metric. According to one embodiment of the invention, the iteration count (I) is inversely proportional to the password length so that as the password length increases, the iteration count decreases by a certain factor. The function for obtaining the iteration count may therefore be expressed as follows:

$I = D(M(P))$

According to one embodiment of the invention, the strength metric may be any value that reflects the password strength. For example, the strength metric may be as simple as the length of the input password 20. According to this example, longer passwords are deemed to be stronger than shorter passwords, and result in larger strength metrics.

In another example, the key derivation module may be configured to process and review the actual content and/or format of the password 20, and assign a strength metric based on this review. For example, the key derivation module may compare the password against a dictionary database for determining whether the password is a word contained in the dictionary database. If it is, the password is assigned a particular strength metric. If the password does not appear in the dictionary database, the password is assigned another strength metric that is higher than the strength metric assigned to a password that does appear in the dictionary database.

In other embodiments, the metric function may be more complex and utilize a weighted scheme that measures the password strength based on various criteria, and then generates a final strength metric that is a weighted aggregate of the individual strength metrics calculated based on the various criteria. For example, a final strength metric may be a weighted aggregate of a strength metric given to a password that is not in a given dictionary, and a strength metric given to the password that contains particular characters, such as, for example, upper/lowercase letters, digits, and non-alpha characters (e.g. "!@#$%^&*( )").

One weighted scheme assigns the alphabet into weighted groups as follows:

Group 0 is digits (0-9)

Group 1 is ANSI characters

Group 2 is special characters (~!@#$%^&*( )_< >?:"{ } [ ];',./-=)

Each group is assigned a particular strength metric. According to this example, each character making up the password is assigned a strength based on the group to which it belongs, and a final strength metric is calculated by aggregating the strength of each character. Table I is an exemplary code for computing the strength metric of a given password in this manner.

TABLE I

```
float ComputeStrength(wchar *password) {
    Static float groupWeigths[NUM_GROPUS] = {1, 2, 3};
    Float strength = 0;
    While (*password) {
        Strength += groupWeigths[getGroup(*password)];
    }
    return strength;
}
```

Another mechanism for measuring password strength includes compressing the password based on, for example, a Huffman or arithmetic encoding, as is well known to those of skill in the art. According to this mechanism, the key derivation module measures the number of bits taken by the compressed keyword, and generates a strength metric commensurate to the number of bits. Specifically, the lesser the number of bits of the compressed password (i.e. the better the compression efficacy), the weaker the password strength, and hence, the smaller the strength metric.

According to another example, the key derivation module measures the differences between the characters in the password and uses this measurement for the strength metric. The greater the differences, the greater the strength metric. Thus, a password containing the characters "################" would be deemed to be weaker, and hence, have a smaller strength metric, than a password containing the characters "ajsdeu."

According to one embodiment of the invention, the iteration count (I) is constrained to minimum and maximum values so that if the computed password strength is outside a pre-determined strength boundary, a pre-defined iteration count is selected as the interaction count (I). For example, if the computed password strength is less than a minimum threshold strength, a predefined maximum iteration value is returned as the iteration count. If, however, the computed password strength is greater than a maximum threshold strength, a predefined minimum iteration value is returned as the iteration count. For a password which strength that is in-between the minimum and maximum threshold strengths, the iteration count is a predefined value that is scaled based on the computed strength. Table II is an exemplary code for computing the iteration count based on this particular embodiment:

TABLE II

```
Unit ComputeIterationCount(float passwordStrength) {
    If (passwordStrength < MinLimit)
        return MaxIterations;
    if (passwordStrength > MaxLimit)
        return MinIterations;
    return 10000000 / passwordStrength;
}
```

Figure 3:
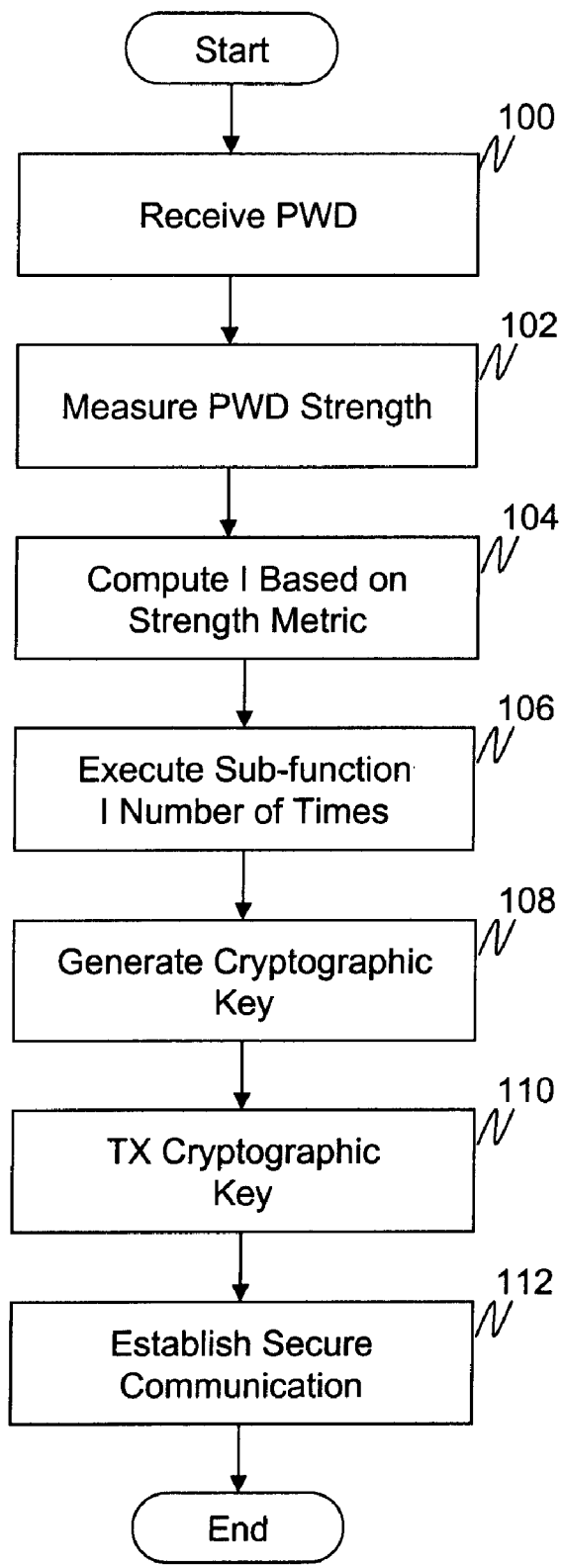
FIG. 3 is a flow diagram of a password-based key derivation process according to one embodiment of the invention.

FIG. 3 is a flow diagram of a password-based key derivation process according to one embodiment of the invention. A person of skill in the art should recognize that the steps of the process may be executed in the indicated order or in any other order recognized by a person of skill in the art.

The process starts, and in step 100, the key generating system 10 receives a password (P). For example, the password (P) may be input by a user as his or her secret code. In another example, the password may be provided to, or encoded in, a smart device included in the key generating system 10, and an interface unit also included in the key generating system may interact with the smart device to obtain the password from the smart device.

The receipt of the password (P) invokes the PKD function 32 to derive a cryptographic key based on the received password. Accordingly, in step 102, the PKD function invokes the metric function MO 36 to measure the strength of the password and output a strength metric in response.

In step 104, the PKD function invokes the dynamic iteration count function 38 to dynamically compute the iteration count (I) based on the computed strength metric. According to one embodiment of the invention, the iteration count (I) inversely scales based on the computed strength metric. Thus, if a first password has a first strength metric that is computed to be larger than the strength metric computed for a second password, the first password is assigned an iteration count (I) that is proportionally smaller than the iteration count computed for the second password.

In step 106, the cryptographic sub-function 34 is invoked and executed as many times as indicated by the computed iteration count (I), and in step 108, the cryptographic key is generated based on the repeated sub-function and other parameters input to the PKD function 32. The PKD function 32 might also pre-process and post-process some data before it enters and/or after it leaves step 106.

In step 110, the generated cryptographic key is transmitted to the key utilizing system 12 which then utilizes the key in any manner that will be apparent to a person of skill in the art. For example, the key utilizing system 12 may use the cryptographic key to establish a secure communication with the key generating system as shown in step 112.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. In a computer system, a method for generating and utilizing cryptographic keys comprising:
   receiving a password by a key generating system;
   measuring by the key generating system strength of the received password and outputting a strength metric in response;
   dynamically computing an iteration count I by the key generating system based on the output strength metric, wherein I≧0;
   repeating by the key generating system a cryptographic function the computed I number of times;
   generating a cryptographic key based on the repeated cryptographic function and the received password; and
   transmitting the generated cryptographic key to a key utilizing system for use therewith.

2. The method of claim 1, wherein the password contains alphanumeric characters.

3. The method of claim 1, wherein the password contains numeric values.

4. The method of claim 1, wherein the password is a secret code associated with a user of the key generating system.

5. The method of claim 1, wherein the measuring of the strength of the received password includes measuring a length of the password, wherein the iteration count decreases as the length of the password increases.

6. The method of claim 1, wherein the measuring of the strength of the received password includes determining whether the password is a word contained in a dictionary, wherein the iteration count for a particular password contained in the dictionary is higher than the iteration count for another password not contained in the dictionary.

7. The method of claim 1, wherein the measuring of the strength of the received password includes:
   compressing the password by the key generating system; and
   measuring efficacy of the compression, wherein the iteration count decreases as the compression efficacy decreases.

8. The method of claim 1, wherein the measuring of the strength of the received password includes:
   determining by the key generating system the strength of each character in the received password;
   aggregating by the key generating system the strength of each character; and
   generating the strength metric based on the aggregate strength.

9. The method of claim 1 further comprising:
   determining that the strength metric is outside a pre-determined strength boundary; and
   selecting a pre-defined iteration count as the iteration count I responsive to the determination.

10. The method of claim 1, wherein the cryptographic function is a sub-function of a key derivation function, wherein the cryptographic key is generated by the key derivation function.

11. The method of claim 1 further comprising:
    establishing a secure communication between the key generating system and the key utilizing system based on the generated cryptographic key.

12. A key generating system comprising:
    a processor; and
    a memory operably coupled to the processor and storing program instructions therein, the processor being operable to execute the program instructions, the program instructions including:
    receiving a password;
    measuring strength of the received password and outputting a strength metric in response;
    dynamically computing an iteration count I based on the output strength metric, wherein I≧0;
    repeating a cryptographic function the computed I number of times;
    generating a cryptographic key based on the repeated cryptographic function and the received password; and
    transmitting the generated cryptographic key to a key utilizing system for use therewith.

13. The system of claim 12, wherein the password contains alphanumeric characters.

14. The system of claim 12, wherein the password contains numeric values.

15. The system of claim 12, wherein the password is a secret code associated with a user of the key generating system.

16. The system of claim 12, wherein the program instructions for measuring the strength of the received password includes program instructions for measuring a length of the password, wherein the iteration count decreases as the length of the password increases.

17. The system of claim 12, wherein the program instructions for measuring the strength of the received password includes program instructions for determining whether the password is a word contained in a dictionary, wherein the iteration count for a particular password contained in the dictionary is higher than the iteration count for another password not contained in the dictionary.

18. The system of claim 12, wherein the program instructions for measuring the strength of the received password includes program instructions for:
    compressing the password by the key generating system; and
    measuring efficacy of the compression, wherein the iteration count decreases as the compression efficacy decreases.

19. The system of claim 12, wherein the program instructions for measuring the strength of the received password includes program instructions for:
    determining by the key generating system the strength of each character in the received password;
    aggregating by the key generating system the strength of each character; and
    generating the strength metric based on the aggregate strength.

20. The system of claim 12, wherein the program instructions further comprise:
    determining that the strength metric is outside a pre-determined strength boundary; and
    selecting a pre-defined iteration count as the iteration count I responsive to the determination.

21. The system of claim 12, wherein the cryptographic function is a sub-function of a key derivation function, wherein the cryptographic key is generated by the key derivation function.

22. The system of claim 12 further comprising:
    establishing a secure communication between the key generating system and the key utilizing system based on the generated cryptographic key.

* * * * *